United States Patent [19]

Taylor

[11] 4,133,844

[45] Jan. 9, 1979

[54] PRODUCT AND PROCESS

[75] Inventor: Jack D. Taylor, Hendersonville, Tenn.

[73] Assignee: E. I. Du Pont de Nemours and Company, Wilmington, Del.

[21] Appl. No.: 818,085

[22] Filed: Jul. 22, 1977

[51] Int. Cl.$^2$ .............................................. C08L 77/00
[52] U.S. Cl. ........................... 260/857 L; 260/857 UN
[58] Field of Search .................................. 260/857 L

[56] References Cited

U.S. PATENT DOCUMENTS

| | | | |
|---|---|---|---|
| 3,326,826 | 6/1967 | Cohen | 260/857 L |
| 3,331,888 | 7/1967 | Cantatore | 260/857 L |
| 3,337,651 | 8/1967 | Press | 260/895 |
| 3,337,652 | 8/1967 | Press | 260/895 |
| 3,375,213 | 3/1968 | Press | 260/17 |
| 3,433,853 | 3/1969 | Earle | 260/857 L |
| 3,465,060 | 9/1969 | Oldham | 260/857 L |
| 3,484,838 | 12/1969 | Press | 260/895 |
| 3,494,980 | 2/1970 | Lees | 260/857 L |
| 3,505,429 | 4/1970 | Press | 260/857 L |
| 3,554,933 | 1/1971 | Grainger | 260/857 L |

*Primary Examiner*—Paul Lieberman

[57] ABSTRACT

There is disclosed an acid and disperse dyeable polyolefin composition consisting essentially of from about 80–98% by weight of a polyolefin, from about 1–10% by weight of a N-vinyl-2-pyrrolidone polymer having a moisture regain, measured at 37.8° C and 98% relative humidity, of at least 10% and a ratio of mole fraction of N-vinyl-2-pyrrolidone units in the polymer to moles of water regained for 100 g of polymer of from greater than 0:1 to about 0.3:1, and from about 1–10% by weight of a polyamide having tertiary amine nitrogen atoms,

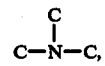

where all three carbon atoms are saturated, said polyamide being normally a solid at 22° C, melting at a temperature of 235° C or below, and having a structure number, N, as defined herein, of from 10–18. At least 25 mole % of all units in the polyamide have a basic tertiary amine nitrogen atom. There are also disclosed a method of preparing a preferred embodiment of the composition of the invention, filaments prepared from the polyolefin composition and woven and nonwoven sheets prepared from the filaments.

17 Claims, No Drawings

PRODUCT AND PROCESS

BACKGROUND OF THE INVENTION

This invention is related to a dyeable polyolefin composition, in particular, a polyolefin composition containing certain modifiers imparting improved acid and disperse dyeability to the polyolefin.

It is well known that articles of polyolefins are rather difficult to dye. This poor dyeability is particularly objectionable in fibers prepared from polyolefins, especially when these fibers are used in preparing primary carpet backing wherein it is desirable to have the carpet backing dyed to a shade of color which makes an acceptable comparison with the shade of color to which the pile fiber is dyed. In this use the woven or nonwoven fibrous polyolefin sheet is tufted with nylon carpet fibers to prepare a tufted carpet which is normally acid dyed at a pH of about 6 since lower pH values can lead to dye streaking of the nylon fibers. However, under these conditions the nylon carpet fibers compete with the polyolefin backing for the dye with the result that the backing becomes inadequately dyed. The need for a polyolefin composition giving acceptable acid dyeability under these conditions is particularly acute.

There have been many suggestions of methods by which the dyeability of polyolefins may be improved. U.S. Pat. No. 3,433,853, issued to Earle on Mar. 18, 1969, discloses an acid-dyeable polyolefin composition comprising 80 to 99.5% by weight of a stereoregular polyolefin and 0.5 to 20% by weight of a basic polyamide comprising the reaction product of one or more dicarboxylic acids or suitable derivatives thereof and a polyamine having not more than two primary amine groups and one or more tertiary amine groups, said basic polyamide being present in an amount sufficient to provide 0.1 to 1.0% by weight of basic nitrogen in the composition. U.S. Pat. No. 3,484,838, issued to Press on Dec. 16, 1969, discloses that improved dyeability with acid and dispersed dyes is obtained with certain stereoregular polyolefins by dispersing in the polyolefin from about 2–20% of a modifying copolymer which is hydrophilic, nonsoluble in the polyolefin, and fusible at a temperature of from 150°–350° C., said modifying copolymer being selected from a particular group of copolymers which includes certain copolymers of N-vinyl-2-pyrrolidone.

U.S. Pat. No. 3,505,429, issued to Press on Apr. 7, 1970, discloses a stereoregular polyhydrocarbon composition with increased dyeability comprising a matrix of a polyhydrocarbon selected from a certain group having concentrated in amorphous regions thereof a modifier combination comprising (1) 95–99% by weight of a modifying polymer containing at least 25% of an oxygen containing N-alkenyl heterocyclic monomer selected from a group of some 20 polymers which include poly N-vinyl-2-pyrrolidone homopolymer and certain copolymers of N-vinyl-2-pyrrolidone and (2) 1–5% by weight of a material selected from a group which includes polyamides such as those obtained from dimerized linoleic acid and alkylene diamines, polycaprolactam nylon, and sebacic acid/hexamethylenediamine/caprolactam terpolymer, said modifier being fusible with said polyolefin at temperatures up to 350° C. The disclosed modifier combination is said to be synergistic.

None of the foregoing references are directed to the specific problem of obtaining dyeable polyolefin composition which displays acceptable dyeability when used to prepare a fibrous woven or nonwoven backing for tufted carpets. Moreover, none of these prior art compositions provides good dyeability at a pH of 6. Hence, there still exists a strong need for a dyeable polyolefin composition which provides good dyeability, particularly when the polyolefin is used to provide a fibrous carpet backing.

SUMMARY OF THE INVENTION

A polyolefin composition having improved acid and dispersed dyeability has been found, said composition consisting essentially of from about 80–98% by weight of a polyolefin, from about 1–10% by weight of an N-vinyl-2-pyrrolidone polymer having a moisture regain, measured at 37.8° C. and 98% relative humidity, of at least 10% by weight and a ratio of mole fraction of N-vinyl-2-pyrrolidone units in the polymer to moles of water regained per 100 g of polymer of from greater than 0:1 to about 0.3:1, and from about 1–10% by weight of a polyamide having tertiary amine nitrogen atoms,

where all three carbon atoms are saturated, said polyamide being normally a solid at 22° C., melting at a temperature of 235° C. or below, and having a structure number, N, of from 10–18. The polyolefin composition gives improved acid dyeability at a pH of about 6 and displays an enhanced dyeability greater than the combined effect of each additive acting alone. At least 25 mole % of all units in the polyamide have a basic tertiary amine nitrogen atom.

In a preferred embodiment wherein the N-vinyl-2-pyrrolidone polymer is poly N-vinyl-2-pyrrolidone and the polyolefin in isotactic polypropylene, there is also provided a process of preparing the polyolefin composition, said process consisting essentially of heating a mixture of a dicarboxylic acid and polyamine in the presence of an aqueous solution of the poly N-vinyl-2-pyrrolidone homopolymer at a sufficient pressure and temperature to polymerize the acid and polyamine to a polyamide and blending the resulting mixture of polyamide and poly N-vinyl-2-pyrrolidone homopolymer with isotactic polypropylene. The invention also includes filaments made from the polyolefin composition and woven and nonwoven sheets prepared from the filaments.

DETAILED DESCRIPTION OF THE INVENTION

The composition of the invention is a polyolefin containing a combination modifier to impart acid and disperse dyeability to the olefin. The polyolefin composition gives improved acid dyeability at a pH of about 6 and displays enhanced dyeability which is greater than the combined effect of each additive acting alone.

One component of the combination modifier of the invention is a polyamide having tertiary amine nitrogen atoms. Polyamides useful in this invention are condensation polymers made from one or more dicarboxylic acids, or derivatives thereof, and one or more polyamines. The dicarboxylic acid moiety or the polyamine moiety or both moieties of the polyamide have at least one basic tertiary amine nitrogen atom with the further proviso that at least 25 mole % of all the dicarboxylic acid and polyamine units in the polyamide are dicarboxylic acid units and/or polyamine units having a basic tertiary amine nitrogen atom.

Dicarboxylic acids suitable for making the polyamides used in the invention have from 2-14 carbon atoms and can be linear or branched aliphatic, alicyclic, aromatic or heterocyclic. Suitable and preferred aliphatic dicarboxylic acids include oxalic, malonic, succinic, glutaric, adipic, pimelic, suberic, azelaic, sebacic and dodecanedioic acids and acids having the general formula

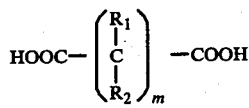

where $R_1$ and $R_2$ can each be hydrogen, alkyl group, alicyclic group, or an aromatic group and m is an integer such that the total number of carbon atoms in the acid is not more than 14.

Suitable alicyclic dicarboxylic acids include cyclohexane dicarboxylic acids. Suitable aromatic acids are benzene-based dicarboxylic acids, such as terephthalic, isophthalic and phthalic acids and alkyl substituted derivatives thereof; diphenyl dicarboxylic acids and naphthalene based dicarboxylic acids. Oxygen atoms, amide, pyridine or pyrrole nitrogen atoms, or sulfur atoms can be freely incorporated into the dicarboxylic acid as, for example, with diphenyl ether, furan, pyrrolidone or thiophene based dicarboxylic acids. For purposes of the present invention, aliphatic and aromatic acids based on benzene are preferred with azelaic and mixtures of azelaic and terephthalic acids being especially preferred.

Suitable dicarboxylic acids having at least one basic tertiary amine nitrogen include those with the formula

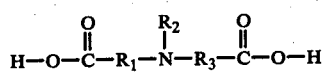

where $R_1$, $R_2$ and $R_3$ can each be a linear or branched aliphatic group, an alicyclic group, aromatic group or a heterocyclic group. Of course, mixtures of the foregoing acids can be employed in the present invention. Other suitable dicarboxylic acids include those represented by the formula

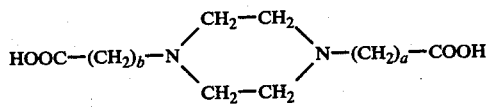

where a and b are integers of from 1 to 4.

For the purposes of the present invention, useful polyamines having a basic tertiary amine nitrogen atom have from 3 to 20 carbon atoms and two amine groups which can react with the dicarboxylic acid to form amide linkages. One such group of polyamines are compounds having the formula

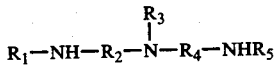

where $R_1$ and $R_5$ are each hydrogen or an aliphatic, alicyclic or aromatic group and $R_2$, $R_3$ and $R_4$ are each an aliphatic, alicyclic, or aromatic group. One such polyamine is N,N'-bis(3-aminopropyl)methylamine.

Another group of useful polyamines are piperazine-based polyamines of the general formula

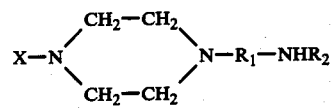

where $R_1$ is an aliphatic, alicyclic, heterocyclic or aromatic group, $R_2$ is a hydrogen or an aliphatic, alicyclic or aromatic group and X is hydrogen or the group $-R_1NHR_2$. The piperazine ring can also be substituted with alkyl, aryl or alkoxy groups. Typical piperazine-based polyamines are 1,4-bis(3-aminopropyl)-piperazine, 1,4-bis(2-aminoethyl)piperazine and 1-(2-aminoethyl)-piperazine. In a preferred composition of the invention the polyamide is derived from piperazine-based polyamine of the foregoing class represented by the formula

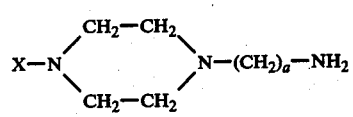

where X can be hydrogen or a $-(CH_2)_b-NH_2$ group and a and b are integers from 2 to 5. These polyamines are for convenience referred to herein by the formulas aPIP and aPIPb with a and b having the above designated meanings. When the polyamine has a basic tertiary amine nitrogen, up to about 50% of the polyamine can be replaced by an $\alpha,\omega$-alkylene diamine, such as ethylene diamine and hexamethylenediamine.

Polyamines useful in the present invention and which do not contain a basic tertiary amine nitrogen atom are diamines having from 2 to 12 carbon atoms and can be linear or branched aliphatic, alicyclic, heterocyclic or aromatic. Suitable diamines include those of the general formula

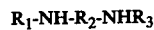

where $R_1$ and $R_3$ are each alkyl or hydrogen and $R_2$ can be a linear or branched aliphatic, aromatic or heterocyclic group. Typical polyamines of this class include $\alpha,\omega$-alkylene diamines, such as ethylenediamine, trimethylenediamine, and hexamethylenediamine, and aromatic diamines, such as 1,4-diaminobenzene, 4,4'-diaminobiphenyl and others characterized by the formula

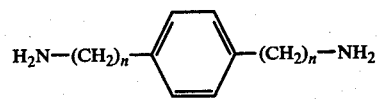

where n is an integer from 0 to 3.

In a preferred embodiment of the invention the polyamide is derived from one or more dicarboxylic acids or derivatives thereof and one or more polyamines, wherein (1) said dicarboxylic acid has from 2-14 carbon atoms and is selected from the group consisting of aliphatic dicarboxylic acids and aromatic dicarboxylic acids based on benzene and said polyamine has from 3–20 carbon atoms and is selected from the group consisting of polyamines having the formula

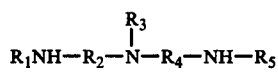

where $R_1$ and $R_5$ are each hydrogen or alkyl groups and $R_2$ and $R_4$ are aliphatic groups and $R_3$ is an alkyl group and piperazine-based polyamines having the formula

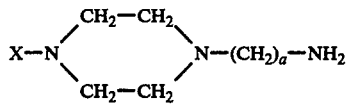

where X is hydrogen or a $-(CH_2)_b-NH_2$ group and a and b are integers from 2 to 5, (2) said dicarboxylic acid has the formula

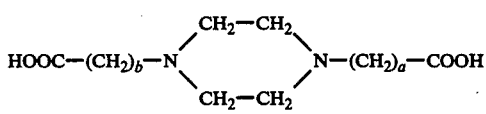

where a and b are integers of from 1–4 and said polyamine is a diamine having from 2–12 carbon atoms and the formula

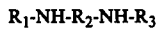

where $R_1$ and $R_3$ are each alkyl or hydrogen and $R_2$ is a linear or branched aliphatic, aromatic or heterocyclic group, or (3) said polyamine is a mixture of polyamine derived from (1) and (2); at least 25 mole % of all the dicarboxylic acid and polyamine units in the polyamide being dicarboxylic acid units and/or polyamine units having a basic tertiary amine nitrogen atom. In a highly preferred embodiment of the present invention the polyamide is derived from 1,4-bis(3-aminopropyl)piperazine and particularly from this polyamine and azelaic and terephthalic acids. These polyamides give exceptionally good dyeability and raw materials for preparing them are readily available.

The polyamide used in the composition of the invention can be a homopolymer or a copolymer. It has been found that not every possible combination of dicarboxylic acid and polyamine will provide a combination modifier which imparts improved acid-dyeability at a pH of about 6 to a polyolefin. According to the present invention, improved acid dyeability at a pH of about 6 is obtained with a combination modifier having as one component a polyamide derived from the aforementioned dicarboxylic acids and polyamines and which polyamide, in addition, is normally a solid at 22° C. and has a melting point that does not exceed 235° C. A polyamide with a melting point significantly higher than 235° C. is very likely to cause melt spinning difficulties if it were incorporated as a combined modifier in a polyolefin composition. Preferably, the polyamide has a melting point of from about 50° to 180° C.

Furthermore, suitable polyamides for the present invention have an empirically defined "structure number", N, of from 10–18. The percent acid dye uptake of a polyolefin composition prepared from a combined modifier decreases below a useful level as the structure number of the polyamide used therein exceeds 18. Preferably, the polyamide has a structure number of from 12–16, most preferably from 13–15. The structure number is derived from the total number of carbon atoms in the dicarboxylic acid and polyamine moieties of the polyamide and is defined by the formula $$N = \frac{X_1 A}{2} + \frac{(1 - X_1)B}{2} + X_2 C + (1 - X_2)D$$

where A, B, C and D represent the number of carbon atoms in the respective formulas for polyamines with A and B carbon atoms and dicarboxylic acids with C and D carbon atoms; $X_1$ is the mole fraction of the polyamine with A carbon atoms and $1-X_1$ is the mole fraction of the polyamine with B carbon atoms, the mole fractions being based on the total moles of polyamine; and $X_2$ is the mole fraction of the dicarboxylic acid having C carbon atoms and $1-X_2$ is the mole fraction of the dicarboxylic acid having D carbon atoms, the mole fractions being based on the total moles of dicarboxylic acid. For example, a copolymer of 1,4-bis(3-aminopropyl)piperazine with an 80/20 mole % blend of azelaic and terephthalic acid would result in A, B, C, D, $X_1$ and $X_2$ being 10, 0, 9, 8, 1 and 0.8 respectively, and thus would have a structure number of 13.8.

The polyamide is present in the polyolefin composition of the invention in an amount of from about 1–10%, preferably 2–8%, by weight based upon the total weight of the composition.

The other component of the modifier of the composition of the invention is a N-vinyl-2-pyrrolidone polymer having a moisture regain, measured at 37.8° C. and 98% relative humidity, of at least 10% and an S ratio, defined as the ratio of the mole fraction of pyrrolidone units in the polymer to the moles of water regained per 100 g of polymer, of from greater than 0:1 to about 0.3:1. The expression "moisture regain" is defined hereinbelow. The N-vinyl-2-pyrrolidone polymer can be a homo- or copolymer with suitable copolymers including those in which the second component is derived from ethylene, ethyl acrylate, 2-ethylhexyl acrylate, vinyl acetate, or the vinyl ester of "Versatic" 10 acid which is a 10-carbon carboxylic acid having the formula

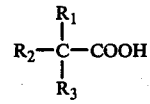

wherein $R_1$, $R_2$ and $R_3$ are saturated alkyl groups. "Versatic" 10 acid is a product of the Shell Chemical Company. Terpolymers of N-vinyl-2-pyrrolidone can also be used in the composition of the invention providing that the moisture regain and S ratio requirements are met. Furthermore, more than one N-vinyl-2-pyrrolidone polymer can be used with a mixture of polyamides in the composition of the invention. The N-vinyl-2-pyrrolidone polymer is present in the present composition in an amount of from about 1–10%, preferably from about 1–8%, by weight based upon the total weight of the composition.

The "moisture regain" test to determine whether or not a particular N-vinyl-2-pyrrolidone polymer is useful in the composition of the invention is based upon a procedure in which an approximately one-gram sample of a finely divided N-vinyl-2-pyrrolidone polymer is dried to a constant weight (± 0.001 g) at about 60° C.

under vacuum with a slow purge of dry nitrogen. The sample is weighed at 24 hour intervals to determine when constant weight is reached. The dried sample is placed in a constant humidity cabinet maintained at a temperature of 37.8° C. and a relative humidity of 98% and is weighed after 4, 10, 20, and 40 hours under these conditions. The percent by weight of moisture regained by the sample is determined at each interval and a plot of the logarithm (base 10) of the percent by weight of moisture regained versus the reciprocal of time is constructed. The "best straight line" is drawn through the experimental points and is extrapolated to a value of 1/time equal to zero. The procedure is repeated with a fresh one gram sample. At a 95% confidence level the difference between the two determinations should be 7.4 or less. If the difference is greater than 7.4, the test must be repeated two separate times until the difference is below the designated value. The average of the moisture regained values at 1/time equal to zero for duplicate samples for which the difference is 7.4 or less is the "moisture regain" value as used herein.

From the known weight percentage composition of the polymer, the mole fraction of N-vinyl-2-pyrrolidone units in the N-vinyl-2-pyrrolidone polymer can be calculated. The mole fraction of N-vinyl-2-pyrrolidone units divided by the moles of water regained per 100 g of polymer gives the ratio of the mole fraction of N-vinyl-2-pyrrolidone in the polymer to moles of water regained per 100 g of polymer, S ratio, as used herein.

Polyolefins useful in the composition of the invention include polyethylene and stereoregular polypropylene, polymethylpentene, and polymethylbutene. In a preferred embodiment of the invention, the polyolefin is isotactic polypropylene, from which useful textile fibers and filaments can be produced by melt spinning.

In general, the polyamide used in the composition of the invention can be prepared by methods of the type set forth in U.S. Pat. No. 3,433,853 the teachings of which in this respect are incorporated herein by reference. N-vinyl-2-pyrrolidone polymer is commercially available. The polyolefin composition of the invention can be prepared by intimately mixing the polyamide and N-vinyl-2-pyrrolidone polymer with the polyolefin by any suitable means, such as by melting the polymers together or by dissolving the polyamide and N-vinyl-2-pyrrolidone polymer in a suitable solvent pouring the resulting solution over the powdered polyolefin and drying and pulverizing the resulting composition.

In another preferred embodiment of the invention, wherein the polyolefin is isotactic polypropylene and the N-vinyl-2-pyrrolidone polymer component of the modifier is poly N-vinyl-2-pyrrolidone homopolymer, exceptionally smooth melt-spun filaments are obtained when the polyolefin composition is prepared by a method which comprises another aspect of the present invention. In this method polymerization to form the polyamide is effected in the presence of the poly N-vinyl-2-pyrrolidone homopolymer in order to obtain an intimate mixture of the two polymers. Polymerization can be accomplished by known methods which comprise heating a mixture of the desired dicarboxylic acid and polyamine at a sufficient temperature and pressure. Thereafter, the resulting intimate mixture of polyamide and Poly N-vinyl-2-pyrrolidone homopolymer is blended with the isotactic polypropylene to obtain a composition of the invention. An isotactic polypropylene composition of the invention prepared in this manner offers additional advantages in that the pressure required to extrude the filaments from a spinneret pack is considerably lower than that required when the polyolefin composition is prepared by other methods and the composition results in substantially higher dyeability. The method of the invention should not be used when the N-vinyl-2-pyrrolidone polymer contains reactive chemical groups capable of interfering significantly with the formation of the polyamide.

The polyolefin modifier combination as set forth herein imparts to the polyolefin an enhanced acid dyeability, i.e., the acid dyeability of the polyolefin composition of the invention is considerably greater than the sum of the acid dyeabilities displayed by a polyolefin composition containing only the same polyamide as used in the composition of the invention and a polyolefin composition containing only the same N-vinyl-2-pyrrolidone polymer as used in the composition of the invention.

The polyolefin composition of the invention can be melt spun to obtain filaments which are directed to a moving belt to give a nonwoven sheet or which are used to prepare a woven sheet. The resulting sheet can, if necessary, be bonded and then tufted with a standard commercial nylon carpet fiber, such as the fiber used in the examples herein below, to obtain a carpet which, when dyed, displays acceptable shade match between backing and face yarn. The level of modifier in the composition can be selected so as to yield a backing which practically matches the dye shade of the yarn when dyed.

The invention is further illustrated by the examples which follow. In these examples, filaments of about 18 denier and nonwoven sheets prepared from the composition of the invention are dyed in a bath along with a commercial 66 nylon carpet fiber (3700 denier, bulked nylon carpet yarn of 18 denier per filament and having 38 milliequivalents/kg of amine ends) using a 1 to 5 weight ratio of polyolefin to nylon and a 40 to 1 weight ratio of dye bath to fiber. Carpets prepared from nonwoven sheets of the inventions by tufting the sheets with nylon pile yarn are similarly dyed in the absence of added nylon fibers. For dyeing with acid dyes, acetic acid is added to the bath to adjust initially its pH to 6.1 ± 0.1. For dyeing with disperse dyes, trisodium phosphate is added to the bath to adjust initially its pH to about 10.5. The dye bath is heated until its temperature reaches about 43° C; and thereafter sufficient dye is added to give 0.8% by weight of dye on the fibers. The dye bath temperature is then raised and held at 99°–100° C. for one hour. In all the examples, unless otherwise stated, the acid dye used is C. I. Acid Blue 25.

Percent dye uptake of a sample is determined by first preparing standard solutions of C. I. Acid Blue 25 dye of various concentrations from a solution containing 0.125 g of dye, 10 ml of deionized water, 2 ml of methanol, and enough 88–90% by weight formic acid to bring the volume of the solution to 250 ml. For each standard, the absorption spectrum, versus 88–90% by weight formic acid as a reference, between 750 and 350 nm is obtained and recorded on chart paper by employing a Beckman DB-GT double-beam spectrophotometer in the double-beam mode using one-centimeter quartz cells and 50 nm/min scanning rate. The areas under the spectrum curves from 700 nm to the absorption minimum at about 420 nm are measured by drawing a straight baseline, cutting the peak thereby defined from the paper and weighing it. From the resulting data a graph is constructed by plotting peak weight versus solution concentration and drawing the "best" straight line through the data points. The coefficients of the straight line are determined and then are used to calculate the amount of dye in subsequent samples.

Thereafter, a dyed polyolefin sample is analyzed for dye uptake by accurately weighing a 0.2–0.3 g sample of dyed material into a 5 ml volumetric flask, adding sufficient 88–90% by weight formic acid to cover the dyed material, then digesting the material on a steam bath for 30–60 minutes, and finally adding sufficient formic acid to bring the volume to 5 ml. The absorption spectrum is obtained and measured in a manner similar to that used for the standard solutions and the amount of dye in the sample is determined by using the coefficients of the line for the standards. This value is then converted into percent by weight of dye in the polyolefin sample by dividing the amount of dye in the solution by the weight of polyolefin material used to prepare the solution and multiplying the result by 100.

A quantitative indication of the enhanced acid dyeability obtained with the modifier combination used in the composition of the invention can be provided by measuring the "percent acid dye enhancement" as defined herein. The value of the percent acid dye enhancement is calculated by determining the acid dye uptake (DU) of the polyolefin article containing the modifier combination of the invention and comparing this uptake with the sum of the uptakes of two separate polyolefin articles, each containing a different component of the combination modifier of the invention at the same concentration level used in the combination. The percent acid dye enhancement is defined by the following relationship $$\% \text{ acid dye enhancement} = \frac{\% DU_C - \% DU_p - \% DU_{vp}}{\% DU_p + \% DU_{vp}} \times 100$$

where $\% DU_c$ is the dye uptake of a polyolefin article containing the combination modifier of the invention with the concentration of the polyamide component being X % and the concentration of the N-vinyl-2-pyrrolidone polymer (VP) component being Y %, $DU_p$ is the % of dye uptake of the polyolefin article containing X % of the polyamide alone and $\% DU_{vp}$ is the % dye uptake of the polyolefin article containing Y % of the N-vinyl-2-pyrrolidone polymer alone, all percentages being by weight.

Melting point of a polyamide is determined by using a Perkin-Elmer differential scanning calorimeter, Model DSC-1B, operating at a scanning speed of + 10° C. per minute. If the differential scanning calorimetric curve shows two melting points for the polyamide, the higher value is taken for the true melting point. Inherent viscosity, as used herein, is measured at 25° C. in a solvent consisting of 90% by weight formic acid using a concentration of 0.5% by weight of polymer per solvent volume. Inherent viscosity is defined as $$\text{Inherent Viscosity} = \frac{\log_e \eta_r}{C}$$

where $\eta_r$ is the ratio of flow time of sample solution to flow time of solvent measured in the same capillary viscometer and C is the polymer concentration in grams/100 ml of solvent. Melt flow rate (MFR), as used herein, is measured by ASTM method number D1238-70, procedure A, condition L.

EXAMPLE 1

To a vessel purged with nitrogen are added 12.0 kg of distilled water, 4.18 kg of 1,4-bis(3-aminopropyl)piperazine (3PIP3), 0.69 kg of terephthalic acid (T), 3.14 kg of azelaic acid (9), and 30.1 g of phenylphosphinic acid, as a stabilizer. The resulting mixture is heated to evaporate 6.80 kg of water and to obtain a clear, deep red solution containing 60% solids by weight. This solution is transferred to a nitrogen-purged autoclave which has been preheated to about 95° C. The vessel in which the solution was previously contained is rinsed with 2.27 kg of distilled water which is then also transferred to the autoclave. A solution of 5.08 kg of poly N-vinyl-2-pyrrolidone homopolymer (PVP) dissolved in 20.4 kg of distilled water is added to the ingredients in the autoclave. The poly N-vinyl-2-pyrrolidone homopolymer has a moisture regain of 106%, a S ratio of 0.17 and a number average molecular weight of 360,000.

After the autoclave is sealed, the reaction mixture is heated to 205° C. with stirring while steam pressure therein is maintained at 1724 kPag (250 psig) by means of a bleed valve. As polymerization proceeds the temperature is increased sufficiently to maintain the steam pressure in the autoclave at 1724 kPag (250 psig). When the temperature reaches 240° C., the pressure is reduced and reduction is continued over a 90 minute period until atmospheric pressure is reached, whereupon the temperature is found to be 255° C. The resulting reaction mixture is stirred at 255° C. for 2 hours under a stream of nitrogen and is then maintained at this temperature for an additional 15 minutes without stirring. The autoclave is pressurized and the resulting molten polymer mixture is extruded as a ribbon which is quenched with a mixture of "Freon" 113 and dry ice. The quenched ribbon is maintained in a nitrogen atmosphere and is cut into flake. The polymer mixture obtained by this procedure contains a polyamide which is a copolymer having azelaic and terephthalic acids in an 80/20 mole ratio. This polyamide is referred to herein as 3PIP3/9,T (80/20) and has a structure number of 13.8. The weight ratio of polyamide to poly N-vinyl-2-pyrrolidone homopolymer in the polymer mixture is 1.4:1. The polymer mixture has an inherent viscosity of 1.31 and a melt flow rate (MFR) similar to that of the isotactic polypropylene with which it is mixed below.

Alternatively, a polyamide salt can be prepared in the poly N-vinyl-2-pyrrolidone solution, thereby minimizing the amount of water which has to be removed in the polymerization step in the autoclave. Also, the extruded ribbon can be encapsulated with a sheath of inert polymer, such as polypropylene, and then water can be used as a quenching agent in lieu of "Freon" 113 and dry ice.

The polymer mixture is mixed with powdered isotactic polypropylene having a melt flow rate of 3.2 and a melting point of 166°–168° C. to obtain a composition of the invention containing 4.12% by weight of 3PIP3/9,T (80/20) and 2.88% by weight of poly N-vinyl-2-pyrrolidone homopolymer. The composition is melted at about 245° C., the resulting melt is extruded through a three-hole die, and the extruded material is quenched with water and cut into pellets. The pellets are dried and then placed in an Extrusion Plastometer which has been preheated to 245° C. to provide a melt which after 5 minutes at 245° C. is extruded. The extruded material is quenched in ambient air and would up on a bobbin at a sufficient speed to provide a spin-drawn fiber. Uniformity of the dispersion of the modifier in the fiber is excellent.

These polypropylene fibers of the invention are evaluated for dyeability using the procedures set forth previously herein. For comparison, polypropylene fibers containing only 2.88% by weight of poly N-vinyl-2-pyrrolidone homopolymer and polypropylene fibers containing only 4.12% by weight of 3PIP3/9,T (80/20) having an inherent viscosity of 1.20 are prepared and similarly tested for dyeability. Disperse dyeability of the fibers of the invention is satisfactory for many uses including carpet backing and is better than that for polypropylene fibers containing 3PIP3/9,T (80/20) alone or poly N-vinyl-2-pyrrolidone homopolymer alone. The results of acid dyeability evaluation are present in Table 1 below.

TABLE 1

| % by weight of acid dye uptake | | | % Acid Dye Enhancement of the Combined Modifier |
|---|---|---|---|
| 3PIP3/9,T | PVP | Combined Modifier | |
| 0.0374 | 0.0193 | 0.3686 | +550 |

EXAMPLE 2

A 3PIP3/9,T (80/20) poly N-vinyl-2-pyrrolidone modifier similar to that of Example 1 is prepared using procedures similar to those set forth in Example 1. The modifier has an inherent viscosity of 1.28. The modifier is mixed with pellets of isotactic polypropylene having a melt flow rate of 3.2 and a melting point of 166°–168° C. to give a mixture containing 9% by weight of the modifier. This mixture is pelletized using a procedure similar to that used in Example 1. The resulting pellets are dried and then mixed with sufficient pellets of isotactic polypropylene to obtain a composition of the invention containing 4.12% by weight of 3PIP3/9,T (80/20) and 2.88% by weight of poly N-vinyl-2-pyrrolidone homopolymer. This composition is fed in particulate form into an extruder having an outlet temperature of 240° C. to obtain a melt which is then passed through a spinneret at about 240° C. to obtain filaments.

The filaments are segment drawn as described in Henderson, U.S. Pat. No. 3,820,062, to provide lengths of undrawn filament to serve as binder and lengths of drawn filament of about 18 denier to serve as matrix filament. The resulting filaments are deposited on a moving belt to obtain a nonwoven web which is then thermally bonded using a steam bonder of the type set forth in Wyeth, U.S. Pat. No. 3,313,002. The resulting bonded, nonwoven sheet is sprayed lightly (1–2% by weight) with a lubricant, methyl hydrogen polysiloxane, and then tufted with commercial 66 nylon carpet fiber with 7 stitches per 2.54 cm and 5/32 gauge (0.397 cm between rows of tufts) to provide a carpet sample with a pile height of 0.76 cm. The carpet sample with the nonwoven sheet of the invention serving as a primary backing, is evaluated for acid and disperse dyeability. Acid dyes used are C. I. Acid Blue 25, C. I. Acid Red 151 and C. I. Acid Yellow 174. The disperse dyes used are Disperse Red 55, C. I. Disperse Yellow 3 and a mixed dye consisting of 2 parts of Disperse Blue 7 and 1 part of Disperse Violet 28. With acid dyes the nonwoven sheet of the invention gives dyeing which provides good shade match with the dyed nylon pile yarn. For disperse dyeability, the dye uptake of the polypropylene carpet backing is satisfactory and eliminates objectionable "grin through" by the backing.

EXAMPLE 3

A 3PIP3/9,T (80/20) polyamide having an inherent viscosity of 1.20 is prepared by conventional polymerization procedures, cut into flake and mixed with powdered poly N-vinyl-2-pyrrolidone homopolymer having a moisture regain of 106%, a S ratio of 0.17 and a number average molecular weight of 360,000 and sufficient powdered isotactic polypropylene similar to that used in Example 1 to obtain a composition of the invention containing 4.12% by weight of 3PIP3/9,T (80/20) and 2.88% by weight of poly N-vinyl-2-pyrrolidone homopolymer. The composition is melted at about 245° C., extruded through a 3-hole die, quenched with water and then cut into pellets which are dried and placed into an Extrusion Plastometer having been preheated to 245° C. The composition is held at 245° C. for 5 minutes to obtain a melt which is then extruded, quenched in ambient air and wound on a bobbin at a sufficient speed to provide spin-drawn fibers. The resulting spin-drawn fibers are tested for dyeability. Disperse dyeability is found to be satisfactory. Acid dyeability results for these fibers and for fibers prepared similarly from a polypropylene composition containing 4.12% by weight of 3PIP3/9,T (80/20) and from a polypropylene composition containing 2.88% by weight of poly N-vinyl-2-pyrrolidone homopolymer are given in Table 2 below.

Table 2.

| | % Acid Dye Uptake | | |
|---|---|---|---|
| 3PIP3/9,T (80/20) | Poly N-vinyl-2-pyrrolidone | Combined Modifier | % Acid Dye Enhancement |
| 0.0374 | 0.0193 | 0.1540 | +172 |

EXAMPLES 4–15

A copolymer of the vinyl ester of "Versatic" 10 acid and 79.9% by weight of N-vinyl-2-pyrrolidone is prepared by conventional addition polymerization using a free radical catalyst. This copolymer, which is referred to as VP/VV-10 (79.9/20.1), has a moisture regain of 83% and an S ratio of 0.190. The copolymer is ground and mixed with isotactic polypropylene similar to that used in Example 1 to obtain a mixture having 12% by weight of VP/VV-10 (79.9/20.1). The mixture is pelletized using a procedure similar to that described in Example 1. A 3PIP3/9,T (80/20) polyamide, structure number of 13.8 and melting point of 87° C., is prepared and mixed with pellets of isotactic polypropylene to provide a 12% by weight of polyamide containing mixture which is similarly pelletized. Pellets of the two polypropylene mixtures are mixed in suitable proportions with sufficient pellets of unmodified isotactic polypropylene to give a composition of the invention containing 4% by weight of VP/VV-10 (79.9/20.1) and 6% by weight of 3PIP3/9,T. This composition is melt spun from a screw extruder spinning arrangement at a temperature of 250° C. The extruded filaments are quenched in ambient air, drawn from a hot roll (120° C.) using a draw ratio of 2.1 to give filaments of about 18 denier, and thereafter deposited on a moving belt to provide a nonwoven sheet. The filaments are evaluated for dyeability. Disperse dyeability is satisfactory.

Filaments of polypropylene separately containing only 4% by weight of VP/VV-10 (79.9/20.1) and only 6% by weight of 3PIP3/9,T (80/20) are similarly prepared and evaluated.

Similarly other polypropylene samples are prepared using 3PIP3/9,T (80/20) and other polymers of N-vinyl-2-pyrrolidone. Also, there are prepared comparison samples, each containing an N-vinyl-2-pyrrolidone polymer having an S ratio greater than 0.3:1. The results are presented in Table 3.

melt spun as described in Example 2 to obtain filaments which are evaluated for acid and disperse dyeability. Disperse dyeability is found to be satisfactory in that it would eliminate objectionable "grin through". Acid dyeability results are presented in Table 4 where comparison is made to acid dyeability of polypropylene filaments similarly prepared but containing only one of the modifier components.

TABLE 3

| | | | | | | % Acid Dye Uptake of Polyolefin With | | | |
|---|---|---|---|---|---|---|---|---|---|
| Example | N-vinyl-2-pyrrolidone (VP) Copolymer | | Moisture Regain (%) | S Ratio | % VP Co-polymer | % 3PIP3/9,T (80/20) | VP Co-polymer Only | 3PIP3/9,T 80/20 Only | Combined Modifier | % Acid Dye Enhancement |
| 4 | VP/VV-10 | (79.9/20.1) | 83.0 | .190 | 4 | 6 | 0.0125 | 0.1544 | 0.3704 | +122 |
| 5 | VP/VV-10 | (84.9/15.1) | 91.3 | .179 | 4 | 6 | 0.0153 | 0.1544 | 0.4940 | +191 |
| Comparison Sample I | VP/VV-10 | (43.6/56.4) | 23.1 | .453 | 4 | 6 | 0 | 0.1504 | 0.0712 | −53 |
| 6 | VP/2-ethylhexyl acrylate | (74.6/25.4) | 73.5 | .203 | 4 | 6 | 0.0164 | 0.0471 | 0.1530 | +141 |
| 7 | " | (65.2/34.8) | 56.0 | .243 | 4 | 6 | 0.0100 | 0.0471 | 0.0962 | +69 |
| Comparison Sample II | " | (43/57) | 15.4 | .650 | 4 | 6 | 0 | 0.1275 | 0.0985 | −23 |
| 8 | VP/ethyl acrylate | (85.8/14.2) | 85.0 | .179 | 4 | 6 | 0.0155 | 0.0471 | 0.3797 | +507 |
| 9 | " | (67.3/32.7) | 84.5 | .139 | 4 | 6 | 0.0121 | 0.0471 | 0.3078 | +420 |
| 10 | " | (49/51) | 45.0 | .186 | 4 | 6 | 0.0096 | 0.0471 | 0.1935 | +241 |
| Comparison Sample III | " | (25.8/74.2) | 9.75 | .439 | 4 | 6 | 0.0103 | 0.1275 | 0.1068 | −23 |
| 11 | VP/vinyl acetate | (78.1/21.9) | 90.0 | .147 | 5 | 5 | 0.0108 | 0.040 | 0.151 | +197 |
| 12 | " | (70.9/29.1) | 86.5 | .136 | 5 | 5 | 0.0103 | 0.04 | 0.232 | +361 |
| 13 | " | (66/34) | 79.5 | .136 | 5 | 5 | 0.0181 | 0.0187 | 0.4058 | +1003 |
| 14 | " | (46.8/53.2) | 55.0 | .132 | 5 | 5 | 0.0168 | 0.0187 | 0.2570 | +624 |
| 15 | VP/ethylene | (37.5/62.5) | 12.9 | .183 | 5 | 5 | 0 | 0.0187 | 0.0648 | +247 |

TABLE 4

| | | | Inherent Viscosity of the Polyamide | | Percent Acid Dye Uptake | | | |
|---|---|---|---|---|---|---|---|---|
| Example | Polyamide (% by wt.) | Structure No. | | Melting Point | Polyamide | VP/VA | Combined Modifier | Acid Dye Enhancement |
| 16 | 3PIP3/12 (7.5) | 17 | 2.18 | 156 | 0.0158 | 0.0181 | 0.1397 | +312 |
| 17 | 2PIP2/9 (5) | 13 | 2.05 | 224 | <.01 | 0.0181 | 0.0687 | >+145 |
| 18 | 2PIP/9 (5) | 12 | 1.43 | 75 | 0.0237 | 0.0181 | 0.1493 | +257 |
| 19 | MIBPA/9 (5) | | 1.15 | 57 | 0.0329 | 0.0221 | 0.2015 | +266 |

EXAMPLES 16–19

Using conventional procedures, polyamides having tertiary amine nitrogen atoms are prepared from 1,4-bis(3-aminopropyl)piperazine and 1,10-dodecanedioic acid (3PIP3/12), 1,4-bis(2-aminoethyl)piperazine and azelaic acid (2PIP2/9), 1-(2-aminoethyl)piperazine and azelaic acid (2PIP/9), and N,N'-bis(3-aminopropyl)methylamine and azelaic acid (MIBPA/9). Polyolefin compositions are prepared from each of these polyamides by mixing each with a N-vinyl-2-pyrrolidone copolymer, containing 34% by weight of vinyl acetate and 66% by weight of N-vinyl-2-pyrrolidone and having a moisture regain of 79.5% and an S ratio of 0.136, and powdered isotactic polypropylene similar to that used in Example 1 to provide compositions of the invention containing 5% by weight of the N-vinyl-2-pyrrolidone copolymer (VP/VA) and the polyamide concentration shown in Table 4. Each mixture is pelletized and

EXAMPLES 20–22

A polyamide is prepared by conventional procedures by reacting azelaic and terephthalic acids with 1,4-bis(3-aminopropyl)piperazine, the mole ratio of the two acids in the final polyamide being 80/20. Compositions of the invention containing different proportions of the polyamide (N = 13.8, melting point = 87° C.) and different proportions of a copolymer of N-vinyl-2-pyrrolidone and vinyl acetate similar to that used in Examples 16–19 are prepared following a procedure similar to that described in Examples 4–15. The acid dyeability of filaments prepared from these compositions is compared to that of filaments containing only one of the modifier components. Acid dyeability results are given in Table 5 below. Disperse dyeability of the compositions of the invention thus prepared is satisfactory in every instance.

Table 5.

| | | | Percent Acid Dye Uptake | | | |
|---|---|---|---|---|---|---|
| | Weight % | | | | Combined | % Acid Dye |
| Example | 3PIP3/T | VP/VA | 3PIP3/9,T | VP/VA | Modifier | Enhancement |
| 20 | 2% | 2% | 0.0108 | 0 | 0.0234 | +117 |
| 21 | 2% | 10% | 0.0108 | 0.0256 | 0.1922 | +428 |

Table 5.-continued

| | Weight % | | Percent Acid Dye Uptake | | Combined | % Acid Dye |
|---|---|---|---|---|---|---|
| Example | 3PIP3/9,T | VP/VA | 3PIP3/9,T | VP/VA | Modifier | Enhancement |
| 22 | 10% | 2% | 0.3376 | 0 | 0.5579 | +65 |

EXAMPLES 23 AND 24

Using conventional procedures, a polyamide is prepared from 1,4-bis(3-aminopropyl)piperazine and isophthalic and terephthalic acids. The acids are present in a mole ratio of 70/30 and, hence, the polyamide is designated 3PIP3/I,T (70/30). The polyamide has a structure number of 13.0, an inherent viscosity of 0.28 and a melting point of 113° C. A polyolefin composition is prepared from the polyamide by mixing a sufficient amount of the polyamide with a N-vinyl-2-pyrrolidone copolymer similar to that used in Examples 16-19 and powdered isotactic polypropylene similar to that used in Example 1 to provide a composition containing 5% by weight of VP/VV (66/34 wt % ratio) and 7.5% by weight of the polyamide. The composition is pelletized and melt spun as described in Example 2 to obtain filaments of about 18 denier which are evaluated for acid and disperse dyeability.

A polyamide is also prepared from 1,4-bis(3-aminopropyl)piperazine and azelaic acid and a heterocyclic dicarboxylic acid, di(2-carboxyethyl)dimethylhydantoin, with the acids being present in a 50/50 mole ratio. The polyamide has a structure number of 15.0, an inherent viscosity of 0.50 and a melting point of 47° C. The di(2-carboxyethyl)dimethylhydantoin used in this example was a commercially available product which is sold by Glyco Chemicals Incorporated of Williamsport, Pennsylvania under the trademark "Dantocon" DCE. A polyolefin composition having 5% by weight VP/VA (66/34 wt. % ratio) and 7.5% by weight of the polyamide which is designated 3PIP3/"Dantocon" DCE, 9 (50/50) is prepared in a manner similar to that described earlier in this example. The composition is also pelletized and melt spun to obtain filaments of about 18 denier which are evaluated for acid and disperse dyeability.

Disperse dyeability of filaments of each polyolefin composition is found to be satisfactory in that it would eliminate objectionable "grin through" if the polypropylene filaments had been made into a woven or nonwoven carpet backing and tufted with nylon carpet fiber. Acid dyeability results are presented in Table 6 where comparison is made to acid dyeability of polypropylene filaments similarly prepared but containing only one of the modifier components.

TABLE 6.

| | PERCENT ACID DYE UPTAKE | | | |
|---|---|---|---|---|
| | Percent Acid Dye Uptake For Polyolefin Composition | | | |
| Polyamide | 5% VP/VA | 7.5% Polyamide | Combined Modifier | % Acid Dye Enhancement |
| 3PIP3/I,T (70/30) | 0.0181 | 0.0247 | 0.1772 | +314 |
| 3PIP3/"Dantocon" DCE, 9(50/50) | 0.0181 | 0.0714 | 0.3824 | +327 |

EXAMPLES 25 AND 26

1,4-bis(2-carbomethoxyethyl)piperazine is prepared by a procedure similar to that described in U.S. Pat. No. 3,331,888. The polyamide, 6/3PIP3, is prepared from 127.6 g (1.10 moles) of 1,6-diaminohexane and 232.5 g (0.90 mole) of 1,4-bis(2-carbomethoxyethyl)piperazine following a procedure similar to that described in U.S. Pat. No. 3,331,888 except that after cooling, the resulting reaction product is ground in a Wiley mill and dried instead of being precipitated from a solvent and dried as set forth in the patent. The 6/3PIP3 polyamide has a structure number of 13, an inherent viscosity of 0.57 and a melting point of 230° C. By a similar procedure 10/3PIP3 polyamide is prepared from 155.1 g (0.90 mole) of 1,10-diaminododecane and 232.5 g (0.90 mole) of 1,4-bis(2-carbomethoxyethyl)piperazine. The 10/3PIP3 polyamide has a structure number of 15, an inherent viscosity of 1.10 and a melting point of 177° C.

A polyolefin composition is made from each of these polyamides by mixing each polyamide with a N-vinyl-2-pyrrolidone copolymer similar to that used in Examples 16-19 and isotactic polypropylene similar to that used in Example 1 to provide a composition of the invention containing 5% by weight of the N-vinyl-2-pyrrolidone copolymer (VP/VA) and 6.5% by weight of the polyamide. Each composition of the invention is pelletized and melt spun as described in Example 2 to obtain filaments of about 18 denier which are evaluated for acid and disperse dyeability. Disperse dyeability is found to be satisfactory in that it would eliminate objectionable "grin through" if the polypropylene filaments had been made into a woven or nonwoven carpet backing and tufted with nylon carpet fibers. Acid dyeability results are presented in Table 7 where comparison is made to acid dyeability of polypropylene filaments similarly prepared but containing only one of the modifier components.

TABLE 7.

| | PERCENT ACID DYE UPTAKE | | | |
|---|---|---|---|---|
| | Percent Acid Dye Uptake For Polyolefin Compositions | | | |
| Polyamide | 5% VP/VA | 6.5% Polyamide | Combined Modifier | % Acid Dye Enhancement |
| 6/3PIP3 | 0.0181 | 0.0545 | 0.2169 | +199 |
| 10/3PIP3 | 0.0181 | 0.0107 | 0.0946 | +229 |

I claim:

1. An acid and disperse dyeable polyolefin composition consisting essentially of, based on the total weight of the composition, from about 80–98% by weight of a polyolefin; from about 1–10% by weight of an N-vinyl-2-pyrrolidone polymer having a moisture regain, measured at 37.8° C. and 98% relative humidity, of at least 10% and a ratio of mole fraction of N-vinyl-2-pyrrolidone units in the polymer to moles of water regained per 100 g of polymer of from greater than 0:1 to about 0.3:1; and from about 1–10% by weight of a polyamide having tertiary amine nitrogen atoms,

where all three carbon atoms are saturated, said polyamide being normally a solid at 22° C., melting at a temperature of 235° C. or below, and having a structure member, N, of from 10–18, at least 25 mole % of all units in the polyamide having a basic tertiary amine nitrogen atom.

2. The composition of claim 1 wherein the polyamide is derived from one or more polyamines, said polyamine having two amine groups which can react to form amide linkages, and one or more dicarboxylic acids or suitable derivatives thereof, said acid or derivative having at least one tertiary amine nitrogen atom.

3. The composition of claim 1 wherein the polyamide is derived from one or more dicarboxylic acids or suitable derivatives thereof and one or more polyamines, said polyamine having at least one tertiary amine nitrogen atom in addition to two amine groups which can react to form amide linkages.

4. An acid and disperse dyeable polyolefin composition consisting essentialy of, based on the total weight of the composition, from about 80–98% by weight of a polyolefin; from about 1–10% by weight of an N-vinyl-2-pyrrolidone polymer having a moisture regain, measured at 37.8° C. and 98% relative humidity, of at least 10% and a ratio of mole fraction of N-vinyl-2-pyrrolidone units in the polymer to moles of water regained per 100 g of polymer of from greater than 0:1 to about 0.3:1; and from about 1–10% by weight of a polyamide having tertiary amine nitrogen atoms,

where all three carbon atoms are saturated, said polyamide being normally a solid at 22° C., melting at a temperature of 235° C. or below, and having a structure number of from 10–18; with the proviso that said polyamide is derived from one or more dicarboxylic acids or derivatives thereof and one or more polyamines, wherein (1) said dicarboxylic acid has from 2–14 carbon atoms and is selected from the group consisting of aliphatic dicarboxylic acids and aromatic dicarboxylic acids based on benzene and said polyamine has from 3 to 20 carbon atoms and is selected from the group consisting of polyamines having the formula

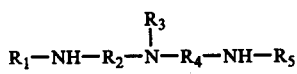

where $R_1$ and $R_5$ are each hydrogen or alkyl groups and $R_2$ and $R_4$ are aliphatic groups and $R_3$ is an alkyl group, and piperazinebased polyamines having the formula

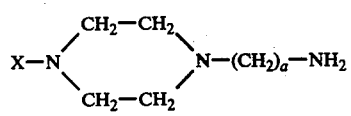

where X is a hydrogen or a —$(CH_2)_b$—$NH_2$ group and a and b are integers from 2 to 5, (2) said dicarboxylic acid has the formula

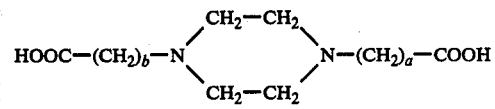

where a and b are integers of from 1–4 and said polyamine is a diamine having from 2–12 carbon atoms and the formula

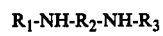

where $R_1$ and $R_3$ are each alkyl or hydrogen and $R_2$ is a linear or branched aliphatic, aromatic or heterocyclic group, or (3) said polyamine is a mixture of polyamine derived from (1) and (2); at least 25 mole % of all the dicarboxylic acid and polyamine units in the polyamide being dicarboxylic acid units and/or polyamine units having a basic tertiary amine nitrogen atom.

5. The composition of claim 4 wherein the polyamide is derived from one or more dicarboxylic acids, or derivatives thereof, having from 2–14 carbon atoms and selected from the group consisting of aliphatic dicarboxylic acids and aromatic acids based on benzene and one or more polyamines having from 3–20 carbon atoms and selected from the group consisting of polyamines having the formula

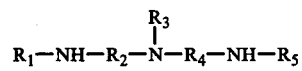

where $R_1$ and $R_5$ are each hydrogen or alkyl groups and $R_2$ and $R_4$ are aliphatic groups and $R_3$ is an alkyl group, and piperazine-based polyamines having the formula

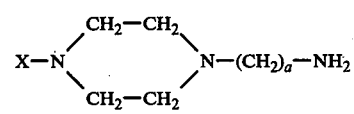

where X is hydrogen or a —$(CH_2)_b$-$NH_2$ group and a and b are integers from 2 to 5.

6. The composition of claim 5 wherein the polyamine has the formula

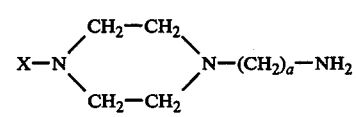

where X can be H or a -$(CH_2)_b$-$NH_2$ group and a and b are integers from 2 to 5.

7. The composition of claim 6 wherein the polyamide has a structure number of from 12–16.

8. The composition of claim 7 wherein the polyamide has a structure number of from 13–15.

9. The composition of claim 8 wherein the polyamide is derived from 1,4-bis(3-aminopropyl)piperazine and azelaic and terephthalic acid.

10. The composition of claim 6 wherein the polyolefin is a stereoregular polyolefin.

11. The composition of claim 10 wherein the polyolefin is isotactic polypropylene.

12. The composition of claim 11 wherein the N-vinyl-2-pyrrolidone polymer is poly N-vinyl-2-pyrrolidone homopolymer.

13. A process for preparing the composition of claim 12 consisting essentially of heating a mixture of the dicarboxylic acid and polyamine in the presence of the poly N-vinyl-2-pyrrolidone homopolymer at a sufficient pressure and temperature to polymerize the acid and polyamine and then blending the resulting mixture of polyamide and poly N-vinyl-2-pyrrolidone homopolymer with isotactic polypropylene.

14. Filaments prepared from the composition of claim 1.

15. Filaments prepared from the composition of claim 4.

16. A woven or nonwoven sheet prepared from the filaments of claim 14.

17. A woven or nonwoven sheet prepared from the filaments of claim 15.

* * * * *